United States Patent [19]

Boltshauser

[11] Patent Number: 6,112,389
[45] Date of Patent: Sep. 5, 2000

[54] TRANSPORT DEVICE AND PALLETS FOR CONTAINERS

[75] Inventor: Werner Boltshauser, Bütschwil, Switzerland

[73] Assignee: Brain Power Consulting GmbH, Sirnach, Switzerland

[21] Appl. No.: 09/043,536

[22] PCT Filed: Sep. 16, 1996

[86] PCT No.: PCT/CH96/00318

§ 371 Date: Mar. 19, 1998

§ 102(e) Date: Mar. 19, 1998

[87] PCT Pub. No.: WO97/11015

PCT Pub. Date: Mar. 27, 1997

[30] Foreign Application Priority Data

Sep. 20, 1995 [CH] Switzerland ............................. 2657/95
Mar. 26, 1996 [DE] Germany ....................... 296 05 595 U

[51] Int. Cl.[7] .............................. B23Q 7/02; B65G 17/46
[52] U.S. Cl. .................. 29/33 P; 198/690.1; 198/867.13
[58] Field of Search ........................... 29/33.9, 563, 564; 53/467; 198/957, 690.1, 867.04, 867.13, 465.1, 343.2, 350; 220/737

[56] References Cited

U.S. PATENT DOCUMENTS

| | | | |
|---|---|---|---|
| 3,578,144 | 5/1971 | Punzak | 198/867.13 |
| 3,602,359 | 8/1971 | Miya et al. | 198/350 |
| 3,621,979 | 11/1971 | Kraeft | 198/867.13 |
| 3,941,237 | 3/1976 | MacGregor, Jr. | 198/867.13 |
| 5,014,868 | 5/1991 | Wittig et al. | 220/737 |
| 5,398,802 | 3/1995 | Clopton | 29/33 P |
| 5,437,361 | 8/1995 | Ohmori et al. | 198/465.1 |
| 5,727,369 | 3/1998 | Mosse | 53/467 |

FOREIGN PATENT DOCUMENTS

| | | |
|---|---|---|
| 0402703 | 12/1990 | European Pat. Off. . |
| 0600130 | 6/1994 | European Pat. Off. . |
| 2416855 | 9/1979 | France . |
| 2165515 | 4/1986 | United Kingdom . |

OTHER PUBLICATIONS

Patent Abstracts of Japan vol. 95, No. 7, Aug. 31, 1995 & JP, A, 07 097034 (Mitsubishi Materials Corp), Apr. 11, 1995.

*Primary Examiner*—William Briggs
*Attorney, Agent, or Firm*—Martin A. Farber

[57] ABSTRACT

In order to facilitate production of cans (3,103,103'), in particular of aerosol cans, magnetic conveyors (6,8) and magnetizable pallets (7,107,107') are provided, instead of chain conveyors including mandrels, in plants for producing containers. The cans (3,103,103') are fixed to the magnetizable pallets (7,107,107') and are passed to or through processing stations, for example, by magnetic belt conveyors (6,8). The pallets (7,107,107') are connected to a connecting portion (132) projecting from the can bottom (130) which may be inserted into a connection opening (117) of the pallet (7,107,107') by a riveting operation. By appropriately arranging the conveying surface (8) of the magnetic conveyor (6,8), the cans (3,103,103') may be oriented at will on the pallets (7,107,107') which are magnetically supported. The can opening is always freely accessible during conveying. In order to compensate for variations of through-put of the plant by simple means, belt conveyors having accumulation zones (46) are provided.

13 Claims, 4 Drawing Sheets

TRANSPORT DEVICE AND PALLETS FOR CONTAINERS

FIELD AND BACKGROUND OF THE INVENTION

The invention relates to plants according to the introductory clause of claim 1, to conveyors according to the introductory clause of claim 8 and to pallets according to the introductory clause of claim 10.

When processing or treating containers, more particularly when producing them, the same are conveyed to processing stations to perform the respective processing steps, are transferred to them, if necessary, are treated and are subsequently carried away. In order to be able to process the container in a cost saving way, the conveying stations and the processing stations have to be well-suited to each other so that a high through-put of containers can be achieved by simple means without any interference. It has been found that known plants for producing containers have been further developed by some minor improvements of individual processing stations only while the conveying concept remained unchanged over a long period of time.

Figure 1:
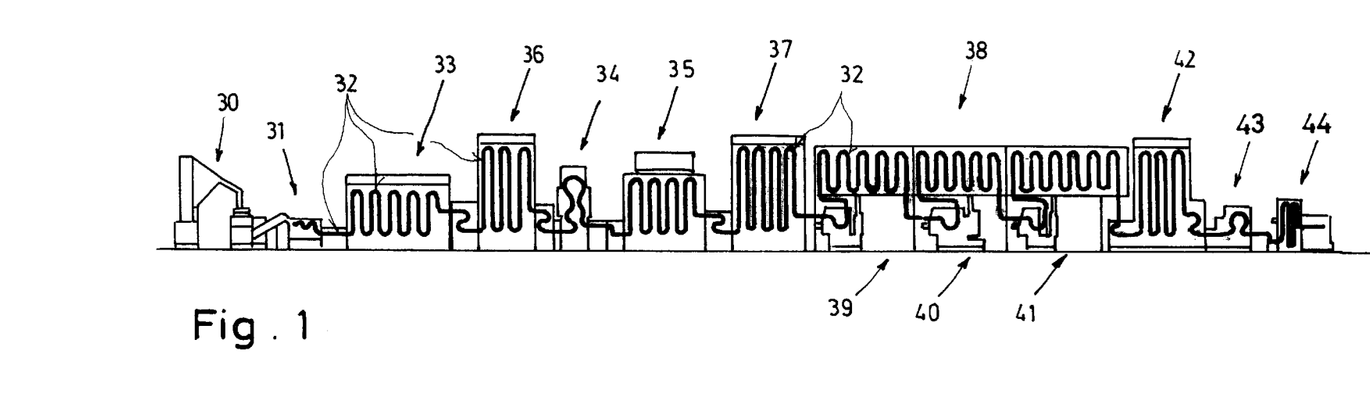
FIG. 1: A plant for processing aluminium cans in accordance with the prior art

The bond to a seemingly unimpeachable conveying concept can, in particular, clearly be recognised in the production of cold-pressed containers, such as aerosol cans or tubes. FIG. 1 shows schematically the principal construction of known plants for producing aluminium cans. The procedure of manufacture begins with a pressing step of a press 30. Immediately afterwards, cutting to size and, optionally, brushing of the raw containers or cans is done in a raw processing machinery 31. Subsequently, the cans are put onto mandrels of a chain conveyor 32 and are led through a cleaning station 33 including a washing device and a drying device. After cleaning, the interior of the cans is coated with a varnish in an inside varnishing device 34. To this end, each can has to be removed from its mandrel of the chain conveyor, has to be put into a supporting pan, and has then to be introduced into a sleeve-like rotatable holder. The inside varnish is discharged from a nozzle which is movable into the interior of the can, while the can is rotated. After that, each can has to be removed from the holder, has to be put into a furnace pan and has to be conveyed in it through a first furnace 35 before being put again onto a mandrel of another chain conveyor 32.

For carrying out the movements along the can's longitudinal axis necessary for inside varnishing, energy intensive pulses of pressurised air are used. These pressurised air pulses, the movements of the supporting pans and the motion of the conveying chain have to be synchronised exactly. The supporting pans, die sleeve-like holders and the furnace pans are adapted to the respective actual can diameter and have to be exchanged for the production of cans of another diameter, thus, leading to long periods of disuse.

In order to compensate for short differences in through-put of the inside varnishing processing station 34, 35 and of the cleaning station 33, a first storage chain 36 is provided which reduces or increases the number of mandrels to be conveyed, correspondingly reducing or increasing the number of returning mandrels. A second storage chain 37 is provided after the inside varnishing station 34, 35 and before an outside processing station 38. The outside processing station 38 comprises an undercoating device 39, a printing device 40 and an overlying varnish device 41. In all three devices 39–41, the cans are put onto a mandrel, are coated and are put onto the chain again to be carried through a drying furnace. When performing this, due to the necessary movements of the cans, substantially the same problems will arise as in inside varnishing.

After outside coating 38, a third storage chain 42 and subsequently a final shaping device 43 is provided, as, for example, for aerosol cans for forming the can's neck, as well as a packing machine 44.

Conveying by chain conveyors which comprise laterally projecting mandrels in predetermined distances for holding the cans is the conveying concept used in the entire production line. The cans are aligned one dimensionally in fixed distances one after one so as to be moved, in average, with the same speed. This substantially rigid can movement throughout the whole plant results in synchronising problems at the processing stations. In order to compensate for local conveying variations due to the operation or its interruption, mechanically expensive compensation or storage devices have to be provided. In addition, the period of dwell of the cans within a processing zone has to be determined substantially by the length of the chain within this zone, resulting in an extremely large chain length in the furnaces because of the long drying periods. Due to this chain conveyor concept, linear production lines rigidly constructed will result which need large workshops, and in which all processing stations have to be matched to each other. In addition, the expenditures for servicing the conveying chain and the energy loss of the furnaces are very high.

SUMMARY OF THE INVENTION

Now, the object according to the invention consists in that to outline a plant for processing containers of any, particularly non-magnetic, material, which is constructed in a simpler and more flexible way and which involves less expenditure for synchronising. Moreover, the conveying device should be formed in such a manner that transfer to processing stations is facilitated.

This object is achieved by realising the features of the introductory clause in conjunction with the characterising features of claims 1 or 8. In addition, when attaining the object according to the invention, the inventive pallet according to claim 10 was found. Alternative and advantageous embodiments are described by the features of the dependent claims, respectively.

When solving the problem, it was recognised that the drawbacks described above with reference to the prior art originate substantially from transporting the cans on mandrels of the conveyor chains. In the approach according to the invention, by conveying the cans by pallets on moveable conveying surfaces, the flexibility necessary for avoiding synchronising problems in the conveying operation is created. With a constant speed of motion of the conveying surface, such as of the conveyor belt of a belt conveyor, the speed of motion of the cans and, thus, the distance between the cans, can be varied, because some slippage is enabled between the conveying surface and the joining surface of the pallet which engages it. By means of guiding and stop members influencing the movement of the pallets on the conveying surface, accumulation zones for compensating for variations of throughput and transfer zones for providing cans at transfer locations can be formed. The processing stations, in accordance with their processing frequency, take cans to be processed out of an accumulation zone or of a transfer location and pass them after processing to a conveying surface without any synchronisation.

In order to prevent, at least in critical conveying zones, that the joining surface disengages unintentionally from the conveying surface, or the can tilts off the pallet, without restricting the relative moveability on the conveying surface, the pallet is formed from magnetizable material, at least in part, and at least one permanent magnet or, optionally, an electromagnet is assigned to the conveying surface within this region so that the pallet adheres to the conveying surface due to magnetic forces. In this way, it is possible that the conveying surface may be oriented in any direction without the cans being released. Such a possibility of arbitrary orientation is advantageous for the transfer to processing stations and, in particular, during processing in the processing stations.

The pallet comprises a joining pallet surface for engaging the conveying surface, and a connection surface including at least one connection means for connecting the pallet to a surface of the can, the joining pallet surface and the connection surface being substantially parallel. With cylindrical cans having an open end and a can closing wall opposite the open end, in order to attain a preferred orientation of the cans relatively to the conveying surface, the closing wall of the can is connected to the connection surface. In this way, it is warranted that the axis of the can is always substantially vertical to the conveying surface.

In order to transfer the cans in a horizontal position to a processing station or to a support member, the conveying surface is, thus, oriented substantially in vertical direction within a transfer zone. Due to the arrangement of the magnetically supported pallet onto the can's bottom, the can is freely accessible from the can's opening and may be displaced onto a supporting mandrel for outside processing or into a sleeve for inside processing without putting it into a support pan. The use of magnetizable pallets has the advantage that the actuation of the can's movements by pulses of pressurised air can be omitted. Actuation or any displacement in the direction of the container's axis necessary for charging and discharging is preferably done by electromagnetic actuation means. When re-adjusting the production line to cans of another diameter, any exchange of supporting pans is avoided. Only the supporting elements have to be exchanged.

In preferred embodiments of the plant, the can is not introduced into a sleeve for inside processing, but is supported by a magnetic supporting surface magnetically holding the pallet. In order to be able to impart rotational movement to the cans during spraying of the inner varnish, the support surface is, in particular, rotatable. In comparison with sleeves, the magnetic support surfaces have the advantage that the do not have to be exchanged when changing to another can diameter, because they may be constructed so as to support cans of different size on pallets of the same size and preferably also for supporting pallets of different size.

Optionally, the cans are moved by a magnetic rotator and/or by stationary or moveable guidances guidingly engaging the pallets into positions opposite the support elements. In case, the movement of the rotator is synchronous with and concentric to the movement of a rotating drum having support elements, the transfer may also be effected onto moving support elements.

In a cleaning station, it is necessary for draining the cleaning liquid that the open end of the cans is downwards directed. This can be achieved without any problem by a magnetic conveyor the conveying surface of which is downwards directed. By replacing the chain conveyors by magnetic conveyors, an arbitrary orientation of the conveyed cans is enabled. In addition, the expenditure for servicing the conveyors is significantly lower, and by providing accumulation zones, particularly on belt conveyors, expensive storage chains can be avoided. Due to the new conveying concept, the plants can be constructed in a more flexible manner. For example, processing zones, preferably associated to belt conveyors, which may be laterally or even vertically offset may replace linear production lines. Thus, the plant may be adapted to existing production space which is not possible, or only with a great expenditure, with plants of the prior art.

The conveying device comprises guiding elements which render the containers, moved by the conveying surface, guidable along any way desired, especially by guiding contact with the pallets, the guiding elements being, optionally, moveable by an actuating device. In this way, separating devices can be provided for distributing the containers fed to at least two partial lines. The partial lines lead, for example, to processing stations working in parallel. After processing in the stations arranged in parallel, a combining device enables combining the containers of at least two partial lines. Such processing in parallel would be excessively expensive in plants having chain conveyors. Within the scope of such a flexible construction of a plant, it may be suitable, to combine the furnaces of different processing steps, in order to minimise the heat losses.

Charging the furnaces is preferably effected by belt conveyors which retain the cans for drying in an accumulation zone within the furnace. Drying is significantly simplified by enabling the cans to be received in the furnaces while standing on the pallets. In particular, the furnace pans become superfluous for drying the inner varnish so that such pans need not to be exchanged when re-adjusting the plant to another can size. In the prior art, a chain leads through the furnace when drying the outer varnish. Such a chain discharges more heat from the furnace than pallets being suitably dimensioned.

The plants according to the invention are not only flexible in their construction, but enable also processing of many differently sized or shaped cans or containers with a minimum expenditure for re-adjustment. By choosing a uniform connection between the pallets and the can's bottom, preferably by selecting the cross-section of the pallets so that it is somewhat larger than the cross-sectional range of at least two current can types, the same pallet can be used for different types of cans. The height of the cans does not matter which is a further advantage in comparison with holding them by mandrels.

In a first zone of the plant, the pallets are connected to the cans which are separated in a final zone while the pallets are returned to the first zone via a pallet return. Within the framework of the return, pallet cleaning, and, especially, pallet storage, is preferably provided. The same plant may be operated with different types of pallets, e.g. with pallet types of different pallet cross-sections, without any problem. To this end, the pallet store may be constructed so that it can either store all pallets of an individual type in separate zones and/or can convey them to the first zone of the plant, if necessary. The plants according to the invention are not restricted to cans of a certain material. Magnetizable or non-magnetizable metals as well as non-metals, particularly plastics, can be considered. The broad spectrum of uses results from the conveyor device which includes magnetic conveyors in conjunction with magnetizable pallets.

BRIEF DESCRIPTION OF THE DRAWINGS

With the above and other objects and advantages in view, the present invention will become more clearly understood in connection with the detailed description of preferred embodiments, when considered with the accompanying drawings of which.

DETAILED DESCRIPTION OF THE PREFERRED EMBODIMENTS

Figure 2:
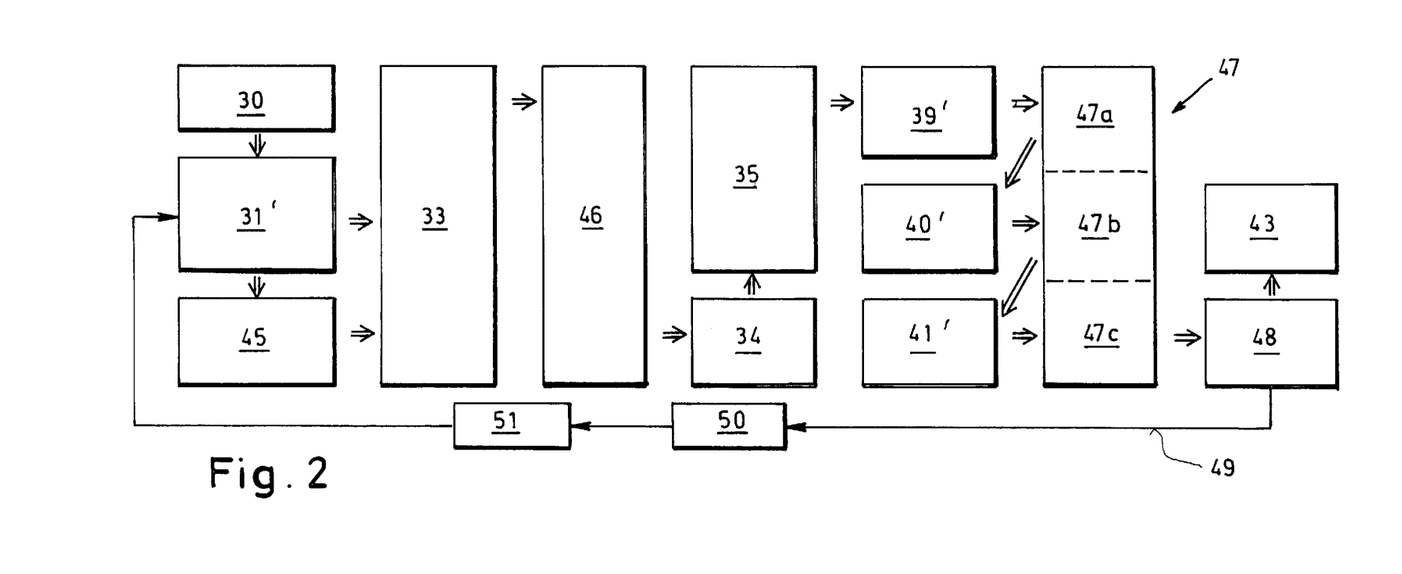
FIG. 2: Flow chart of a plant according to the invention

FIG. 2 shows a flow chart of a plant for producing aluminium cans in accordance with the invention. A press 30 is provided as a first processing station. The raw cans consist of cylindrical sleeve which comprises a charging opening at one end and a closing wall at the other end. At least one connecting portion projects from the closing wall which is substantially outwards directed and is, preferably, centrally arranged. Afterwards, the cans are cut to the length desired, are, optionally, brushed, and are provided with a pallet in a raw processing station 31'. The station 31', thus, comprises a palletising device which connects the connecting portion of the can to the connecting surface of the pallet, preferably by introducing and fixing, particularly by a riveting device, the connecting portion into an opening of the pallet.

Optionally, pallets provided with cans may be introduced into a pre-store 45 for small-scale series. A magnetic belt conveyor, which, optionally may also be charged from the pre-store, leads from the raw processing station 31' to a cleaning station 33. The cans are led by means of the pallets on the conveyor through various cleaning zones, such as degreasing and flushing zones, the conveyor being arranged in such a manner that the cans are held with their container opening downwards before exiting each of the cleaning zone in order to warrant draining of cleaning liquid as completely as possible, and that the cans are held with their container opening downwards when entering, or at least before exiting from, a bath, optionally being provided, in order to enable complete filling of the can interior with cleaning liquid.

A belt conveyor joins to the cleaning zone and includes an accumulating section 46 which retains containers which cannot be passed for a times. The pallets are preferably retained by an actuale retaining means, particularly by a barrier against which the pallets of the containers which are adjacent to the retaining means will prop. The conveying surface passes slidingly below the joining surfaces of the accumulated pallets.

Figure 5:
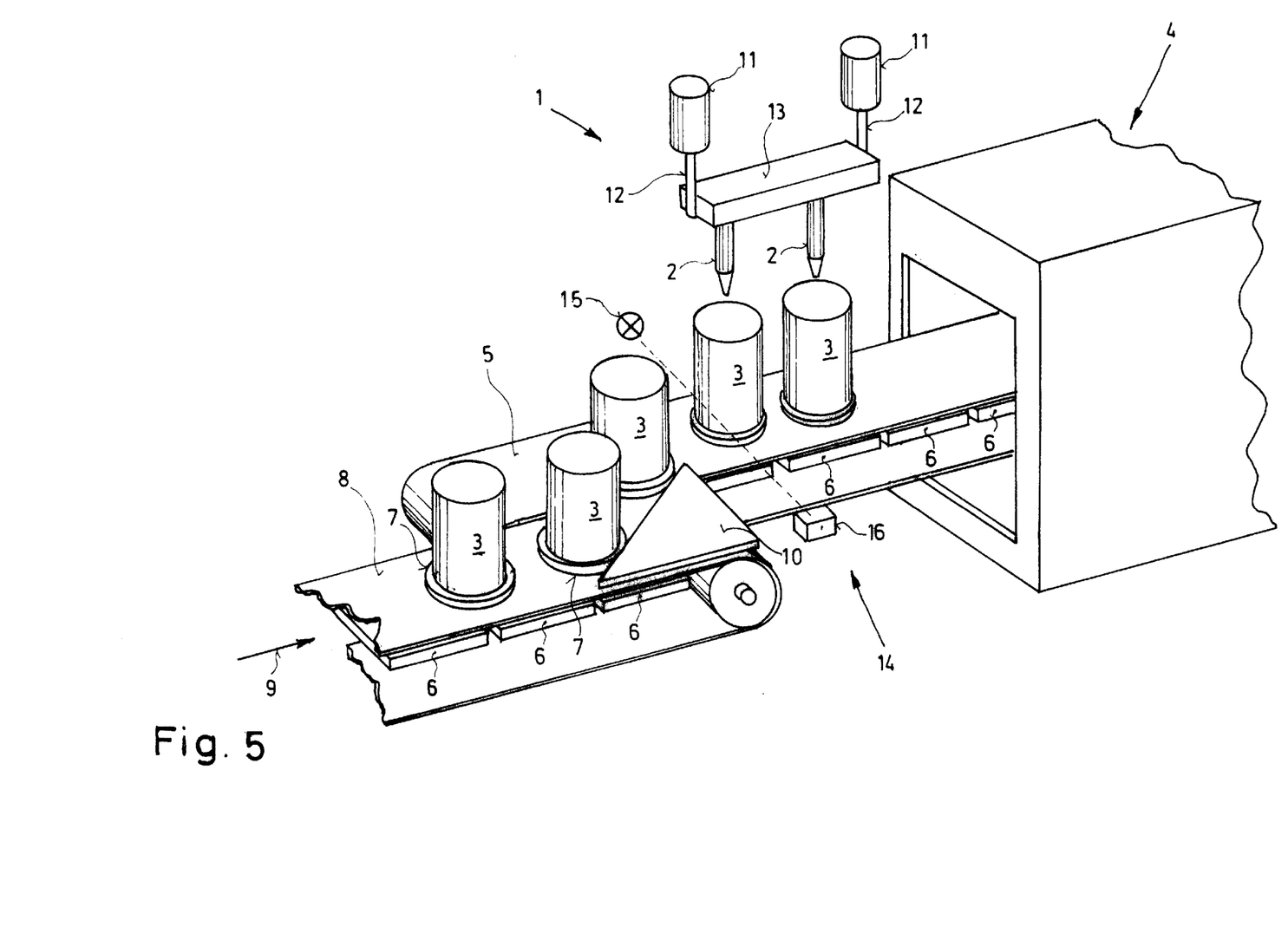
FIG. 5: a perspective view of an inside varnishing processing station

Upon readiness, the cans are fed from the accumulation zone to the adjoining inside varnishing device 34 by means of a, preferably magnetic, feeding conveyor, in particular by a rotator, and are received by the latter in rotatable holders rotating during spraying of varnish while being about horizontally oriented. In plants according to the invention, however, the cans could also simply be transferred and varnished in a vertical orientation. Optionally varnishing could be done without rotation. Since the can opening is freely accessible when conveying by means of pallets, the cans must not necessarily be introduced into a holder of the inside varnishing device, but varnishing can be done directly in the cans standing on the conveying surface together with their pallets, as is represented in FIG. 5. The conveying surface can be moved or may be stopped during varnishing. The at least one varnishing nozzle has to be displaceable towards the cans. Conveying the cans on magnetizable pallets in accordance with the invention has the advantage that it can be applied both with processing stations of plants having conveyor chains and with processing stations constructed according to the new conveying concept. This means that in an existing plant, for example, the conveyor chain can be removed and conveyance between the old processing stations can be replaced by the conveyor according to the invention comprising pallets and magnetic conveyors. It goes without saying that plants constructed according to the new conveying concept can be formed in a still more advantageous manner.

From the inside varnishing device 34, the cans proceed, preferably on a belt conveyor, to an inside varnish furnace 35' where they are retained in an accumulation zone on the belt conveyor for drying. In order to reduce any heat loss and to prevent the exit of gases which might be set free, the furnace 35' may be shut on its outlet side before filling, and may be shut also at its inlet side at the end of filling operation. After drying, the outlet side is opened again so that the cans are further conveyed on the belt conveyor out of the accumulation zone within the furnace 35'. In order to reduce the exit of undesirable gases, gas is sucked off during exit of cans out of the furnace 35', and is fed to a purifying stage. Fresh air streaming into the furnace 35' is preferably guided over the exiting cans in such a manner that it enters the furnace in a pre-heated condition. When all cans are out of the furnace 35', the outlet opening is closed again, and the inlet opening is opened in order to carry out the next drying cycle. In this discontinuous drying operation, an accumulating space of at least the size of the accumulating space of the furnace has also to be provided between the inside varnishing device and the furnace 35'.

In order to attain a simple construction and, in particular, to dry all cans exactly in a uniform manner, it is preferably convenient to use continuously operated pusher-type furnaces. Through such furnaces passes a conveyor belt having preferably a standard width and being loaded with rows of cans in accordance with the belt width from an accumulator-loader. The belt speed is selected in such a manner that the maximum supply of cans can be passed through the furnace. In order to attain the necessary time of heating or drying, the length of the furnace has to be chosen in accordance with the belt speed. After the furnace, the rows of cans running in parallel, particularly when exiting an accumulator zone can be separated again.

Since the cans must no longer be held on their peripheral surface for varnishing inside, plants are suitable in which an outside coating is effected before coating the inside. In such plants, the cans need no longer be held in their interior after varnishing inside which diminishes the strain of the fresh coating of inside varnish. In order to refrain from holding the cans inside, the cans could be supported, for example by the pallet during processing the outside, and could only be held within a small inner zone at the can opening.

In plants according to the invention, it is possible with little expenditure to perform drying to be carried out after each of three outer coatings within a common furnace assembly 47. The cans pass, preferably on a conveying belt, from a priming unit 19' to a first drying zone 47a of the furnace assembly 47 and from there to a printing device 40'. From the printing device 40', the cans pass through a second drying zone 47b to a coating varnishing device 41', and from that through a third drying zone 47c to a depalletising unit 48. Since the outside coating is made preferably with the cans being held in horizontal orientation it may, optionally, be convenient for simplifying the transfer onto or from the belt conveyors passing through the drying zones to construct them as magnetic conveyors having substantially vertical conveying surfaces at least in the zones of transfer. Drying is done either continuously in tunnel furnaces open at both ends, or, preferably, discontinuously, as described with reference to the inside varnish furnace 35'.

Putting the cans onto holding mandrels of the outside coating devices 39', 40', 41', can, optionally, be avoided by holding the cans on the pallet and only inside the edge of the can's opening during coating.

The depalletising device 48 comprises a separating means for separating the pallet from the can, in particular for removing at least part of the connecting portion which projects from the connection surface connected to the pallet. For severing rivet connections, a cutter is provided, for example, which cuts the rivet head off from the side of the pallet averted from the can. By a stop means engaging the pallet can be prevented that part of the pallet might be cut off. After cutting, a separating device will guide both parts to a further guidance.

The cans without the pallets are processed further in a subsequent final shaping device 43, particularly by pressing the can's bottom into the desired shape, and, optionally, by completely removing the connecting portion. At the can opening, a neck is formed for receiving a valve. In plants which perform shaping of the bottom already in the raw processing stage, pallets should be used which meet the shape of the bottom.

From the depalletising station 48, the pallets are passed over a pallet return 49, preferably via an at least partially magnetic belt conveyor, via a pallet cleaning device 50, as preferred, and/or via a pallet storing unit 51 to the palletising station 31'. Besides the pallets just returning, at least as many pallets have to exist, as cans are being processed.

Figure 3:
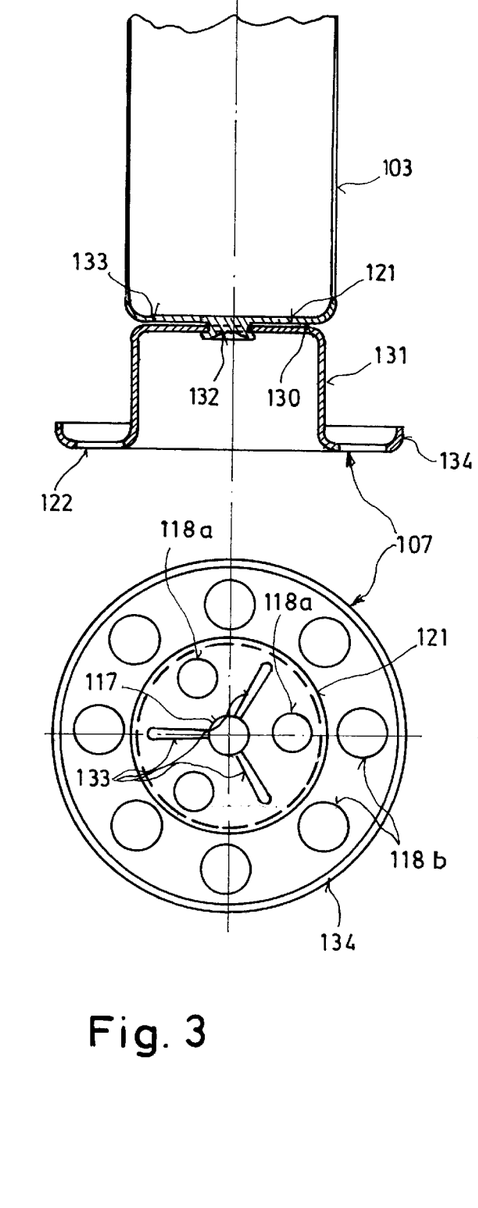
FIG. 3: Cross-sectional view of a pallet and aluminium can as well as a plan view onto a pallet

FIG. 3 shows a preferred pallet 107 for a can 103 where shaping of the bottom is done after depalletising. The pallet 107 has a joining pallet surface 122 for engaging a conveying surface, and a connecting surface 121 including at least one connection means for connecting the pallet 107 to a can's bottom surface 130, the joining pallet surface 122 and the connecting surface 121 being substantially parallel to each other. In a preferred embodiment, the joining pallet surface 122 is annular, and the connecting surface 121 is disk-shaped. The two surfaces 121 and 122 are spaced from each other over a desired distance by a, preferably cylindrical, spacer surface 131. The spacer surface 131 extends preferably from the inner edge of the joining pallet surface 122 to the outer edge of the connecting surface 121.

The connection means comprises at least one, preferably central, connection opening 117 into which a connecting portion 132 of the can wall 130 may be fixed, optionally by friction, but preferably in a positive manner, in particular by riveting. By the riveting operation, the free end of the connecting portion 132 is deformed laterally beyond the edge of the connection opening at the side of the connecting surface 121 which is averted from the can. In order that the rivet connection be firm against any rotation even after any material deformation caused by temperature, an elastic load is preferably built up by spacing the connecting surface 121 and the can wall 130 by spacers 133 within the region of the connecting portion 132. Preferably at least three ribs are provided symmetrically arranged around the connection opening 117. When riveting, the distance between the pallet 107 and the can 103 is somewhat reduced by an elastic deformation of the container bottom and/or of the connecting surface 121. The remaining distance is chosen in such a manner that the can's surface 130 can further be flushed.

At the outer edge of the joining pallet surface 122, a lateral contact surface 134 is provided being substantially perpendicular to the joining surface 122 and extending from the joining surface 122 towards the connecting surface 121.

The pallets will contact both guiding elements and each other into guiding and spacing contact via this contact surface 134.

The pallets for receiving cans are dimensioned in such a way that the can's cross-sectional dimensions or diameters are between the cross-sectional dimensions or diameters of the spacer surface 131 and of the contact surface 134. This warrants that during printing the printing roll can extend beyond the lower edge of the can, but the cans are prevented from contact with each other. It is particularly important immediately after the outside processing that the cans are conveyed free of contact with each other, because in this way damaging the still fresh coating is prevented. In order to be able to receive all current cans by three pallets differently sized, the pallets are dimensioned, for example, for the following ranges of diameters: 22–25 mm, 35–53 mm and 53–66 mm.

Openings 118a in the connecting surface 121 improve the ability of the can wall 130 to be cleaned, and, in conjunction with the openings 118b in the joining surface 122, reduce the weight of the pallets and, thus the amount of heat discharged from the furnaces by the pallets. In order to manufacture the pallets in a cost efficient way, they are stamped out of magnetizable steel and are shaped preferably by deep-drawing as desired.

Figure 4:
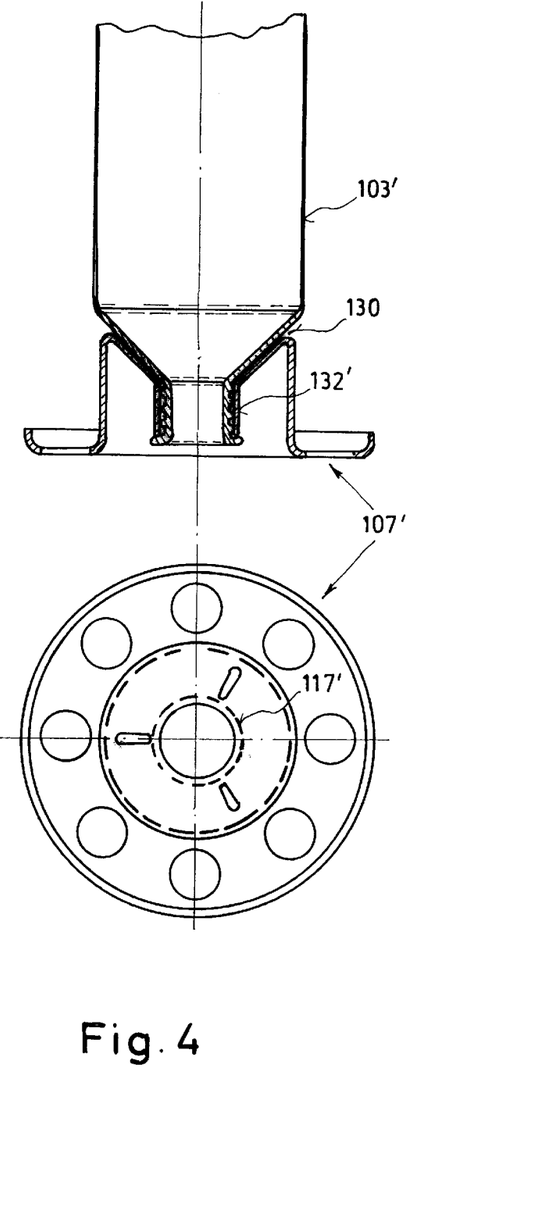
FIG. 4: Cross-sectional view of a pallet and tube as well as a plan view onto a pallet

FIG. 4 shows a pallet 107' constructed in an analogous manner to pallet 107 for tubes 103'. Preferably a threaded portion 132' is used as a connecting portion. In the embodiment shown, a beading of the free end of the threaded portion 132', which results from a pressing operation, protrudes outwards beyond the connection opening 117' so that the tube 103' is fixed to the pallet. When separating tube and pallet, this beading has to be removed. In a preferred embodiment of the pallet 107', at least one, in particular elastic, locking device is provided in order to avoid any necessity of supplementary machining the threaded portion 132'.

To ensure that this device engages the tube 103' in a simple locking operation, a groove is made in the portion 132', e.g. when cutting the thread, preferably at the end of the threaded portion facing the tube. The at least one locking device, which can be laid over the thread in a press-fitted condition, engages the groove so that the tube is fixed to the pallet. In order to ensure good orientation of the tube 103' with respect to the pallet 107', the pallet comprises, preferably three, contacting zones which are engaged by corresponding zones of the outer surface of the tube when the tube is fixed to the pallet by the locking device. The locking device comprises preferably three elastic tongues.

FIG. 5 shows schematically an inside varnishing station comprising a spraying apparatus 1 including spraying nozzles 2 for applying a protecting coating against corrosion to the interior of the cans 3 of non-magnetic material such as aluminium. Subsequently to spraying by means of the nozzles 2, the cans are passed to a drying chamber 4 which is formed, for example, by a tunnel furnace. The construction may either be such that that the cans are discharged at the other end of the drying chamber (not shown), or they are discharged to the left side again (with reference to FIG. 5) by the lower belt portion of a belt conveyor 5 in a manner still to be described. In such a case, it would be possible to provide processing devices also on the side of the lower portion of the belt conveyor 5, such as a further spraying device.

In order to hold the cans 3 securely in their place on the belt 5, the belt conveyor 5 is formed as a magnetic conveyor known per se either by incorporating small permanent magnets into the belt 5 which move together with the latter, or by arranging stationary magnetic plates 6 at the lower side of the belt 5 which, optionally, co-operate with electromagnets located on them or are permanent magnetic too.

To hold the non-magnetic cans 3 firmly on the belt 5, even if, for example, it has to be guided in upward direction or if the cans should remain on its lower portion, magnetizable pallets 7 are distributed over the belt. Thus, these pallets will co-operate with the magnetic plates 6, the latters having to be arranged closely to the lower portion of the belt 5, if it shall be formed to entrain the cans. On the other hand, the pallets 7 could also be fixed to the belt 5. Preferably, however, they are displaceable on it, because it facilitates manipulation, as will become apparent from the following.

In this way, a second belt conveyor 8 may be provided and may, in principle, be also formed as a magnetic belt conveyor which extends parallel to the belt conveyor 5 or under an angle to the belt conveyor 5. In order to move the cans 3 from the belt conveyor 8 to the belt conveyor 5, deviation surfaces 10 are provided which are inclined with respect to the direction of movement (arrow 9) of the belt 8 and which, preferably, do not engage the cans 3 (to conserve their outer surfaces), but the displaceable pallets 7.

While the representation of FIG. 5 shows only one can 3 after the other, the cans 3 may, within the scope of the invention, by arranged in pairs (or even in a greater number) on the respective belt 5 or 8 so as to increase the productivity. In such a case, several processing units have, of course, to be arranged side by side. Then, the deviation surfaces could be formed so as to include a tip located inmidst the belt 8 instead of having a single inclination so as to deviate the cans to the left and to the right side (with respect to the direction of movement 9). Furthermore, it is not necessary to provide belts 5 and 8 of the same type as a conveying means; for example, one belt may have assigned a lateral rotator to which the respective can is displaced to perform a revolution on the rotator, e.g. for varnishing. In order to provide the time for this procedure without having to stop the respective belt conveyor and to operate it in an intermittent fashion, the deviation surfaces could, for example, be moved in a controlled manner into the path of the belt conveyor, e.g. by means of a rack and pinion drive or by a fluidic unit, such as a pneumatic cylinder, instead of being stationarily arranged (as shown in FIG. 5 and, for example, fixed to the frame, not shown, of the belt conveyor 8) so that then even a plurality of subsequent deviation surfaces may alternately project into the path 9 of the belt conveyor 8 or are withdrawn from it to displace the cans 3 to a succession of devices, such as rotators. The cans could be removed from such rotators either by manipulators or by deviation surfaces being displaceable towards the rotator, which move the pallets 7 together with the cans 3 onto the (or another) belt. A further possibility consists in that the pallets 7 themselves are formed as rotators and to drive them, for example, at their periphery as will be explained below with reference to FIG. 7.

It has already been mentioned above that the deviation surfaces 10 may be displaced in a timed manner in accordance with the arrival of cans 3 at the respective location. To this end, optionally, an exact control may be used, an embodiment of which being shown in FIG. 5. Optionally, the same applies for the actuation of processing units such as the spraying device 1. The same shows two cylinder units 11 engaging a support 13 by straps 12. Supply of spraying liquid, such as varnish, is effected through at least one hose not shown connected to the support 13, or through a hose for each nozzle 2.

In order to determine the presence of a can below the respective nozzle 2 (a single one or a whole battery of such nozzles may be provided), a sensor 14 is arranged which may be formed in any manner. In the representation of FIG. 5, it is formed as a light barrier comprising a source of light 15 and an opposite light-electric transducer 16 which, however, could also be situated on the same side of the belt conveyor 5, the transducer 16 receiving, for example, light reflected from the cans 3. The latter arrangement will result in a particularly clear signal at a certain time due to the round periphery thereof.

On the other hand, one is not bound to opto-electric or other radiation sensors in selecting the sensors, since the material of the cans would, in general, also provoke a response of an inductive or capacitive sensor. In any case, the output signal of the respective sensor 14 or the transducer 16 will serve to control appropriate moving units, such as the cylinder 11.

Figure 6:
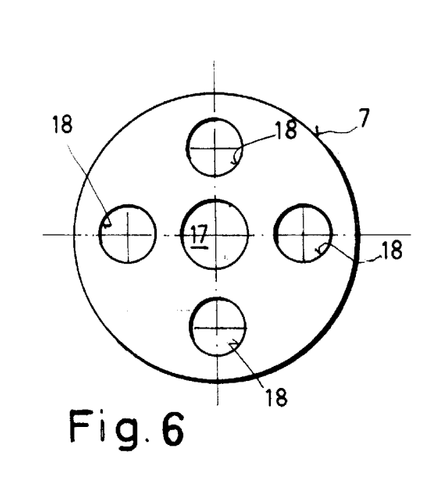
FIG. 6: A plan view onto an embodiment of a magnetizable pallet

The use of magnetizable pallets 7 involves, in general, the use of a relative heavy material. Therefore, it is preferred, if the respective pallet 7, preferably being circular for the intended purpose, has at least one opening permeating its thickness and interconnecting the two main surfaces, as shown in FIG. 6, which reduces the weight, on the one hand, but may also serve additional purposes, on the other hand, as will be still explained. In the embodiment of FIG. 6, apart from a central opening 17, still further openings 18 are provided. These openings 17, 18 may serve as recesses, i.e. as a holding means, for receiving protrusions of the cans, such as a lower can rim 19 (FIG. 8), but a reversed arrangement is also possible in which the pallet has a protrusion which enters a recess of the can 3 or surrounds a rim thereof. This latter variant will, however, not be preferred, because it is, in general, more favourable for completely processing the outer surface of the cans, if the same is freely accessible. This is also the reason for the special constructions in accordance with FIGS. 8 and 5 discussed later on.

Figure 7:
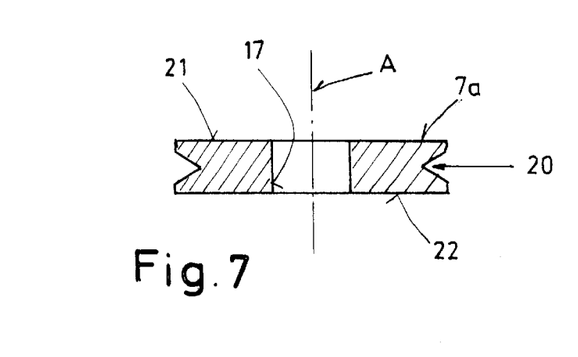
FIGS. 7–9: Cross-sectional views of pallet.

If, as mentioned above, a drive for the pallets is desired, their cross-section may be chosen according to FIG. 7 where a pallet 7a is illustrated having a V-groove 20. With this V-groove 20 two friction disks appropriately formed and arranged at the periphery, e.g. under an angle relatively to a central axis A, could, for example co-operate. Theoretically, also a belt drive would be conceivable, but such a belt had to be put around the circumference of the respective pallet 7a. However, it has to be understood that for rotatively driving the pallets also other constructions of their peripheral surfaces, such as a more or less smooth or a toothed peripheral surface (for the engagement of a pinion) are, actually, possible. Moreover, the central opening 17 could be employed for insertion of a driving shaft, but this will, in general, be less practicable. By the way, in the embodiment of FIG. 7 it should be noted, that the central opening 17 may be dimensioned so largely that the pallet 7a (likewise as the pallets 7b and 7c to be discussed later) is annular in shape.

Another purpose of such a V-groove 20 could be to allow engagement of a deviation surface 10 (see FIG. 5). Such deviation surfaces should suitably have a thickness which corresponds to the thickness of the pallet 7a in maximum so as to ensure not to leave scratches on the can surfaces. Of course, the deviation surfaces may be even arranged at the level of the respective piece good, if it has not so sensitive surfaces, as is the case with the cans 3 shown, in which case the pallets may optionally be fixed to the respective conveyor.

In FIG. 7, a flat embodiment of the pallet 7a can be seen which, accordingly, will have a main or connection surface 21 facing the can (which is supposed to be herein-above) and another main or joining surface 22 facing the magnetic conveyor (5 or 8).

Figure 8:
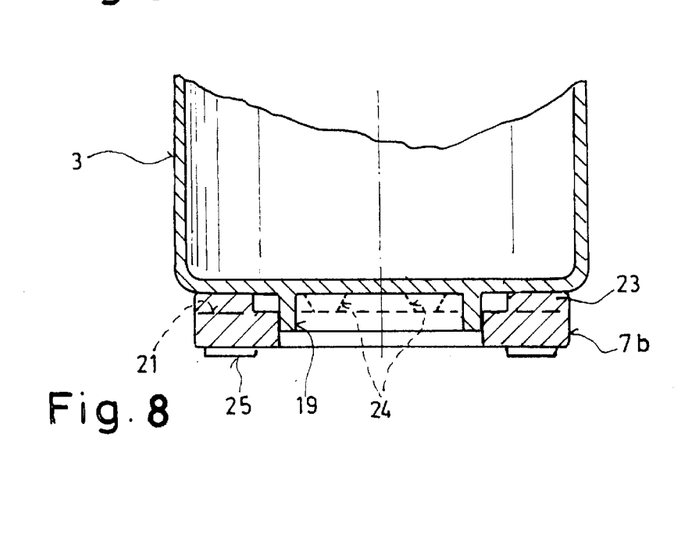

As is particularly shown in FIG. 8, projections 23 may protrude as spacers from the plane of the upper main surface 21 and may leave aerating channels shown in dotted lines between each other so as to allow access of hot air to the lower side, for example within the tunnel furnace 4.

As has been mentioned, free accessibility to the peripheral surface of the respective can 3 will be generally important. Optionally, the pallet 7c has a smaller circumference than the can 3 for this reason, as is shown in FIG. 8.

Figure 9:
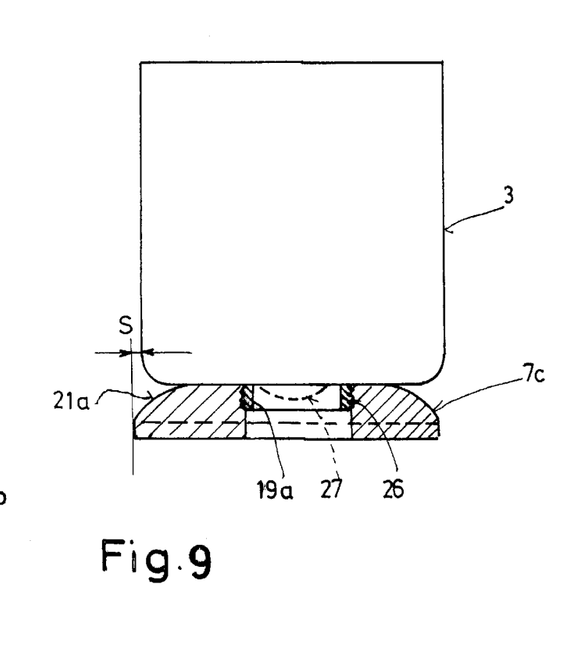

Another approach for a pallet 7c is shown in FIG. 9. In order to increase the stability of the (relative light) can 3 on the pallet, its lower rim 19a may have an outer thread which is screwed into an inner thread 26 of the pallet 7c. In this embodiment, the accessibility of the peripheral surface of the can 3 is ensured in that the pallet has a convex upper main surface 21a, but projecting beyond the periphery of the can by a distance s, thus, improving its stability. The curvature of the surface 21a may also be provided with spacers by a corrugation (see the dotted concave portion 27) to improve the access of air.

Numerous modifications are possible within the scope of the invention; for example, the openings 17, 18 may serve and may be constructed or arranged to allow insertion of processing devices. Although a magnetic belt conveyor is preferred, also other conveyors are conceivable which cooperate with magnets, as has already been mentioned. Moreover, a pallet could be designed to receive a plurality of piece goods 3, e.g. of a pair of cans 3, although this will, in general, not be preferred.

It goes without saying that features of the embodiments described could arbitrarily be combined.

What is claimed is:

1. Plant for processing containers, comprising processing stations for cleaning (33) and coating (34, 39–41, 39'14 41') and drying (35,47), and conveyor means for conveying the containers (3, 103, 103') to the processing stations, wherein the conveyor means comprises at least one magnetic conveyor (6–8) and a magnetizable pallet (7,107,107') to be connected to the container for each container (3,103,103') to be conveyed, a joining pallet surface (122) of the pallet (7, 107, 107') engaging a moveable conveying surface (8) of the magnetic conveyor (6–8) and being held on the conveying surface (8) by the magnetic conveyor (6–8) by means of magnetic forces;

wherein at least one of the following characteristics is provided:
a) the conveyor means (6–8,107,107') comprise at least one, magnetic, belt conveyor (46) which forms an accumulation zone before a processing station (34), thus, retaining containers (3, 103, 103') which cannot be passed at times, the containers (3,103,103') being retained within said accumulation zone by retaining means, which are actuable, in particular by a barrier onto which the pallets (7,107,107') of the containers immediately adjacent to the retaining means abut, while the conveying surface (8) slidingly passes below the joining surfaces (122) of the pallets (7,107,107');
b) the conveyor means (6–8,107,107') comprise guiding elements (10) which render the containers (3,103,103') guidable along a desired path, in particular by guiding contacts with the pallets (7,107, 107'), the guiding elements (10) being displaceable by actuating means;
c) the conveyor means (6–8, 107,107') comprise at least one separating means for distributing the containers fed towards it to at lest two belt conveyors of partial lines leading each to a processing station;
d) the conveyor means comprise at least one combining means for combining containers from at least two belt conveyors of partial lines; and
e) at least two processing stations for carrying out the same processing step are arranged in parallel.

2. Plant for processing containers, comprising processing stations for cleaning (33) and coating (34, 39–41, 39'14 41') and drying (35,47), and conveyor means for conveying the containers (3, 103, 103') to the processing stations, wherein the conveyor means comprises at least one magnetic conveyor (6–8) and a magnetizable pallet (7,107,107') to be connected to the container for each container (3,103,103') to be conveyed, a joining pallet surface (122) of the pallet (7, 107, 107') engaging a moveable conveying surface (8) of the magnetic conveyor (6–8) and being held on the conveying surface (8) by the magnetic conveyor (6–8) by means of magnetic forces;

wherein the conveyor means (6–8,107,107') comprise guiding elements (10) which render the containers (3,103,103') guidable along a desired path, in particular by guiding contacts with the pallets (7,107, 107'), the guiding elements (10) being displaceable by actuating means.

3. Plant according to claim 2, wherein for performing at least one of transferring containers (3,103,103') and removing containers (3,103,103') from processing stations having support members, a magnetic conveyor (6,8) is provided, the conveying surface (8) of which being substantially perpendicular to an axis of the support members so that the axis of the containers, which is substantially perpendicular to the joining pallet surface (122), is parallel to the axis of the support members, and the container (3, 103,103') is operative to be fed to at least one of the support member and to be removed therefrom by displacement in the direction of the container axis to be carried out mechanically, by at least one of pressurised air and electromagnetic actuation device acting onto the pallet.

4. Plant according to claim 2, wherein for transferring containers (3,103,103') to a processing station, at least one magnetic rotator is provided, and there is provided at least one of fixed and moveable guides (10) which guidingly contact the pallets.

5. Plant for processing containers, comprising processing stations for performing at least one of cleaning, coating and drying, and conveyor means for conveying the containers (3, 103, 103') to the processing stations, wherein the conveyor means comprises at least one magnetic conveyor (6–8) and a magnetizable pallet (7,107,107') to be connected to the container for each container (3,103,103') to be conveyed, a joining pallet surface (122) of the pallet (7, 107, 107')

engaging a moveable conveying surface (8) of the magnetic conveyor (6–8) and being held on the conveying surface (8) by the magnetic conveyor (6–8) by means of magnetic forces;

wherein at least one processing station for drying (35,47) cleaned or coated containers is formed as a furnace comprising a furnace charging, belt conveyor (5) going through, the belt conveyor (5) comprising an accumulation zone at least within the furnace (35,47) wherein the containers (3,103,103') are retained during the necessary drying period; and wherein at least one of the following characteristics is provided:

a) the furnace (35,47) comprises a shutting means at least in the outlet region, and in the inlet region, retaining the pallets (7,107,107') and the containers (3,103,103') on the furnace belt conveyor (5), reducing, in particular, also heat losses;

b) a sucking device for sucking fresh air into the furnace (35,47) is formed in such a manner that fresh air is passed over dried exiting containers (3,103, 103') during sucking, thus pre-heating it; and         c) at least two furnaces (47a,47b,47c) subsequent to different processing steps are adjacent to each other or formed as a common furnace (47) for reducing heat losses by radiation.

6. Plant for processing containers, comprising processing stations for cleaning (33) and coating (34, 39–41, 39'14 41') and drying (35,47), and conveyor means for conveying the containers (3, 103, 103') to the processing stations, wherein the conveyor means comprises at least one magnetic conveyor (6–8) and a magnetizable pallet (7,107,107') to be connected to the container for each container (3,103,103') to be conveyed, a joining pallet surface (122) of the pallet (7, 107, 107') engaging a moveable conveying surface (8) of the magnetic conveyor (6–8) and being held on the conveying surface (8) by the magnetic conveyor (6–8) by means of magnetic forces;

wherein the conveyor means (6–8,107,107') comprise at least one, magnetic, belt conveyor (46) which forms an accumulation zone before a processing station (34), thus, retaining containers (3, 103, 103') which cannot be passed at time, the containers (3,103,103') being retained within said accumulation zone by retaining means, which are actuable, in particular by a barrier onto which the pallets (7,107,107') of the containers immediately adjacent to the retaining means abut, while the conveying surface (8) slidingly passes below the joining surfaces (122) of the pallets (7,107,107').

7. Plant for processing containers, comprising processing stations for at least one of cleaning, coating and drying, and conveyor means for conveying the containers (3, 103, 103') to the processing stations, wherein the conveyor means comprises at least one magnetic conveyor (6–8) and a magnetizable pallet (7,107,107') to be connected to the container for each container (3,103,103') to be conveyed, a joining pallet surface (122) of the pallet (7, 107, 107') engaging a moveable conveying surface (8) of the magnetic conveyor (6–8) and being held on the conveying surface (8) by the magnetic conveyor (6–8) by means of magnetic forces; wherein     a) a palletising station (31') is provided which after shaping, containers (3,103,103') having a shell round about a container axis, a charging opening at one end of the shell and a closing surface (130) at the other end including at least one connecting portion (132) projecting outwards substantially in the direction of the axis of the container, and being centrally situated, of each container (3,103,103') connects to a pallet (7,107, 107'), comprises a riveting device leading the connecting portion (132) through a connection opening (117) in the pallet (7,107, 107') and then pressing the connecting portion (132) broad at that side of said connection opening (11/) which is averted from the container (3,103,103');

b) a depalletising station (48) which removes at least one section of a connecting portion (132) of the processed containers (3,103,103'), which projects out of a connection opening (117) of a pallet (7,107,107') in a rivet-like manner, and which enables separate conveyance of said pallets (7, 107,107') and said containers (3,103,103') by means of a separating device;

c) a pallet cleaning means (50) for cleaning at least one of pallets (7,107,107') and pallet storing means (51) for storing pallets (7,107, 107') not in use; and     d) return conveyor means (49), is provided by which the pallets (7,107,107') can be led from the depalletising station (48), over at least one of a pallet cleaning means (50) and a pallet storing means (51), to the palletising station (31').

8. Plant for processing containers, comprising processing stations for cleaning (33) and coating (34, 39–41, 39'14 41') and drying (35,47), and conveyor means for conveying the containers (3, 103, 103') to the processing stations, wherein the conveyor means comprises at least one magnetic conveyor (6–8) and a magnetizable pallet (7,107,107') to be connected to the container for each container (3,103,103') to be conveyed, a joining pallet surface (122) of the pallet (7, 107, 107') engaging a moveable conveying surface (8) of the magnetic conveyor (6–8) and being held on the conveying surface (8) by the magnetic conveyor (6–8) by means of magnetic forces;

wherein the conveyor means (6–8, 107,107') comprise at least one separating means for distributing the containers fed towards it to at least two belt conveyors of partial lines leading each to a processing station.

9. Plant for processing containers, comprising processing stations for cleaning (33) and coating (34, 39–41, 39'14 41') and drying (35,47), and conveyor means for conveying the containers (3, 103, 103') to the processing stations, wherein the conveyor means comprises at least one magnetic conveyor (6–8) and a magnetizable pallet (7,107,107') to be connected to the container for each container (3,103,103') to be conveyed, a joining pallet surface (122) of the pallet (7, 107, 107') engaging a moveable conveying surface (8) of the magnetic conveyor (6–8) and being held on the conveying surface (8) by the magnetic conveyor (6–8) by means of magnetic forces;

wherein the conveyor means comprise at least one combining means for combining containers from at least two belt conveyors of partial lines.

10. Plant for processing containers, comprising processing stations for cleaning (33) and coating (34, 39–41, 39'14 41') and drying (35,47), and conveyor means for conveying the containers (3, 103, 103') to the processing stations, wherein the conveyor means comprises at least one magnetic conveyor (6–8) and a magnetizable pallet (7,107,107') to be connected to the container for each container (3,103, 103') to be conveyed, a joining pallet surface (122) of the pallet (7, 107, 107') engaging a moveable conveying surface (8) of the magnetic conveyor (6–8) and being held on the conveying surface (8) by the magnetic conveyor (6–8) by means of magnetic forces;

wherein at least two processing stations for carrying out the same processing step are arranged in parallel.

11. Plant for processing containers, comprising processing stations for performing at least one of cleaning, coating and drying, and conveyor means for conveying the containers (3, 103, 103') to the processing stations, wherein the conveyor means comprises at least one magnetic conveyor (6–8) and a magnetizable pallet (7,107,107') to be connected to the container for each container (3,103,103') to be conveyed, a joining pallet surface (122) of the pallet (7, 107,107') engaging a moveable conveying surface (8) of the magnetic conveyor (6–8) and being held on the conveying surface (8) by the magnetic conveyor (6–8) by means of magnetic forces;

wherein at least one processing station for drying (35,47) cleaned or coated containers is formed as a furnace comprising a furnace charging, belt conveyor (5) going through, the belt conveyor (5) comprising an accumulation zone at least within the furnace (35,47) wherein the containers (3,103,103') are retained during the necessary drying period; and the furnace (35,47) comprises a shutting means at least in the outlet region, and in the inlet region, retaining the pallets (7,107,107') and the containers (3,103,103') on the furnace belt conveyor (5), reducing, in particular, also heat losses.

12. Plant for processing containers, comprising processing stations for performing at least one of cleaning, coating and drying, and conveyor means for conveying the containers (3, 103, 103') to the processing stations, wherein the conveyor means comprises at least one magnetic conveyor (6–8) and a magnetizable pallet (7,107,107') to be connected to the container for each container (3,103,103') to be conveyed, a joining pallet surface (122) of the pallet (7, 107,107') engaging a moveable conveying surface (8) of the magnetic conveyor (6–8) and being held on the conveying surface (8) by the magnetic conveyor (6–8) by means of magnetic forces;

wherein at least one processing station for drying (35,47) cleaned or coated containers is formed as a furnace comprising a furnace charging, belt conveyor (5) going through, the belt conveyor (5) comprising an accumulation zone at least within the furnace (35,47) wherein the containers (3,103,103') are retained during the necessary drying period; and a sucking device for sucking fresh air into the furnace (35,47) is formed in such a manner that fresh air is passed over dried exiting containers (3,103, 103') during sucking, thus pre-heating it.

13. Plant for processing containers, comprising processing stations for performing at least one of cleaning, coating and drying, and conveyor means for conveying the containers (3, 103, 103') to the processing stations, wherein the conveyor means comprises at least one magnetic conveyor (6–8) and a magnetizable pallet (7,107,107') to be connected to the container for each container (3,103,103') to be conveyed, a joining pallet surface (122) of the pallet (7, 107,107') engaging a moveable conveying surface (8) of the magnetic conveyor (6–8) and being held on the conveying surface (8) by the magnetic conveyor (6–8) by means of magnetic forces;

wherein at least one processing station for drying (35,47) cleaned or coated containers is formed as a furnace comprising a furnace charging, belt conveyor (5) going through, the belt conveyor (5) comprising an accumulation zone at least within the furnace (35,47) wherein the containers (3,103,103') are retained during the necessary drying period; and at least two furnaces (47a,47b,47c) subsequent to different processing steps are adjacent to each other or formed as a common furnace (47) for reducing heat losses

* * * * *